United States Patent Office 3,186,803
Patented June 1, 1965

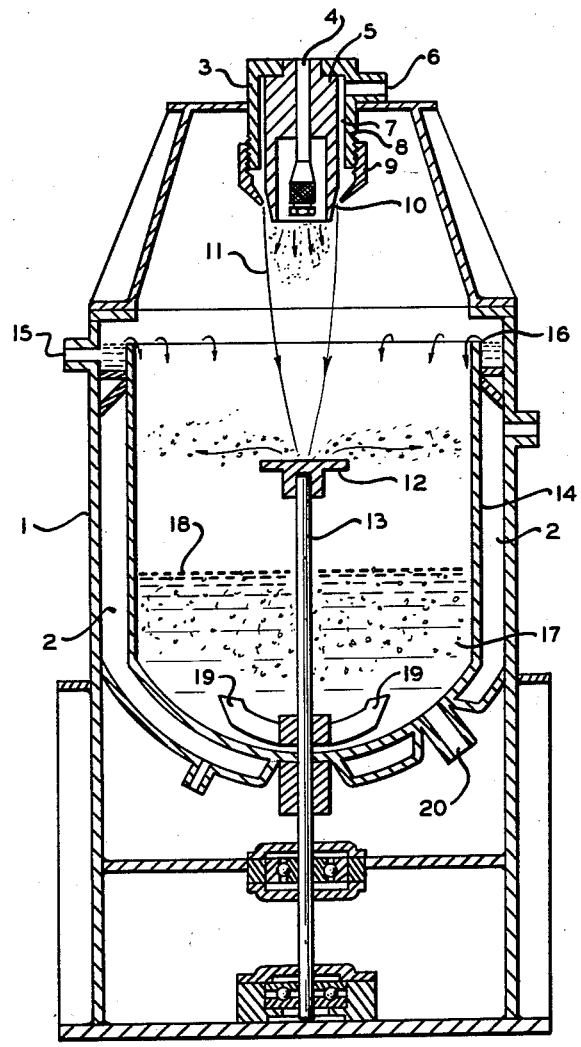

3,186,803
APPARATUS FOR MIXING A RELATIVELY VISCOUS LIQUID WITH A RELATIVELY NON-VISCOUS LIQUID
Michijiro Akaboshi, Moto-machi, Toyonaka City, Tsuguo Kominami, Nishinomiya City, Seigo Fukuda and Kikuji Uragami, Toyama City, Japan, assignors to Kurashiki Rayon Co., Ltd., Okayama Prefecture, Japan, a corporation of Japan
Filed Feb. 5, 1959, Ser. No. 791,384
Claims priority, application Japan, Feb. 11, 1958, 33/3,463, 33/3,464, 33/3,465
4 Claims. (Cl. 23—285)

The present invention pertains to a novel method and apparatus for rapidly admixing a relatively viscous liquid with a relatively non-viscous liquid. The invention further relates to a method and apparatus for rapidly admixing a viscous liquid with a relatively non-viscous liquid to form a mixture which reacts to form a solid product, and subsequently dispersing the mixture into small droplets and carrying out the reaction to produce a fine, uniform solid product. This invention is especially adapted for the production of polyvinyl alcohol by base catalyzed alcoholysis of a polymeric vinyl ester such as polyvinyl acetate.

It is known in the art to produce polyvinyl alcohol through the saponification of a polymeric vinyl ester, usually polyvinyl acetate. By saponification is meant in the present specification and claims the base catalyzed alcoholysis of polyvinyl ester to form polyvinyl alcohol. Usually a viscous alcohol solution of polyvinyl acetate is admixed with an aqueous or alcoholic solution of a strong base such as sodium hydroxide or sodium methylate. Saponification of the polyvinyl acetate rapidly takes place. During the saponification, the mixture changes from a viscous liquid to a sticky semi-solid to a hard solid product. Because of the nature of the reactants and reaction products, it has been extremely difficult to saponify polyvinyl alcohol in a continuous and economic manner. Prior techniques have involved mixing the reactants and conveying the reaction mixture from the mixing zone until the reaction was completed thereby producing solid polyvinyl alcohol. However, in order to further treat and purify the polyvinyl alcohol, it was necessary first to crush or shred the solid polyvinyl alcohol into small particles. Non-uniform particles were produced which after treatment gave a somewhat non-uniform product.

Other prior problems involved the tendency of the saponifying admixture to adhere to surfaces in the reaction chamber causing clogging and stoppage of moving parts and other difficulties.

It is an object of the present invention to provide a new and improved method and apparatus for the production of polyvinyl alcohol.

It is an additional object of the invention to provide a novel method and apparatus for rapidly and easily admixing a viscous liquid with a non-viscous liquid.

Still a further object of the invention is to provide a method for avoiding sticking of a reaction mixture to reaction vessel walls during a reaction.

Other objects will be apparent from the following description of the invention.

The attached drawing illustrates in diagrammatic form an embodiment of the apparatus of the instant invention.

Referring to the drawing, saponifier 1 is equipped with heating jacket 2 to provide temperature control of the reaction zone. Mixer 3 is located at the top of the saponifier. Inlet line 4 is provided in the mixer to convey the relatively non-viscous liquid, e.g. the aqueous or alcohol solution of basic catalyst to the mixing zone. Inlet line 6 is provided through which the viscous liquid passes on its way to the mixing zone. The viscous liquid passes through line 6 and through space 7 which is formed between solid tubes 5 and 8. Adjusting cap 9 is screwed to the lower end of tube 8. The viscous liquid passes between cap 9 and the lower end of tube 5 on its way to the mixing zone. The lower end of tube 5 is inclined as indicated in the attached drawing. Thus by screwing cap 9 up or down, the clearance between cap 9 and tube 5 and hence the thickness of the film of viscous liquid passing to the mixing zone can be easily controlled. Alternatively, means can be provided for moving tube 5 up and down in relation to cap 9 thereby controlling the thickness of the film of liquid passing between cap 9 and tube 5.

The clearance between cap 9 and tube 5 is adjusted to provide a very thin annular slit through which the viscous liquid passes. The viscous liquid passes through the thin slit and enters the mixing zone in the configuration of an annular thin continuous film. By adjusting the shape of the slit through which the viscous liquid passes, film shapes other than round can be obtained, e.g. plate-shaped. Generally round slits are preferred.

The continuous film of viscous liquid passes downwardly past the lower end of tube 5. Connected to the lower end of inlet line 4 and positioned within tube 5 is spray nozzle 10. The relatively non-viscous liquid passes through line 4 and is sprayed through nozzle 10 in the form of very fine droplets inside the thin continuous film of viscous liquid. In place of a spray nozzle, other means such as a rotary disc can be provided for spraying the non-viscous liquid inside the viscous liquid film. In this way, the relatively non-viscous liquid rapidly and uniformly contacts the film of viscous liquid and is admixed therewith.

Positioned below the spray nozzle 10 and tube 5 is rotary disc 12 rotated by shaft 13. The continuous film 11 of viscous liquid containing the sprayed relatively non-viscous liquid passes downwardly and impinges on the rotary disc as shown in the drawing. As indicated in the drawing, the liquid film while passing from the slit between cap 9 and tube 5 to the rotary disc 12 contracts in cross section due to the viscosity and surface tension of the film.

The film impinges on rotary disc 12 and is further admixed and is thrown by the rotary motion of disc 12 outwardly toward the walls 14 of the reaction vessel in the form of fine particles or droplets. It is preferred to provide projections on the peripheral edge of the rotary disc or radial dam plates on the disc to further improve the mixing of the liquid as a result of impinging on the rotary disc.

An additional liquid is introduced continuously into the reaction zone through inlet 15 and overflows dam 16. The liquid overflow passes downwardly in the form of a film along the walls 14 of the reactor. The fine particles or droplets of admixed liquids which are thrown centrifugally outward by disc 12 are carried downwardly by the liquid film along the reactor walls. In this way, adhesion of the admixed liquids or their reaction products to the walls of the reactor is prevented. The liquid film flows along the walls of the reactor downwardly into slurry 17 maintained at constant level 18. Agitator means 19 are provided to continuously agitate the slurry. Slurry product is taken from the reactor through outlet 20.

Practice of the invention is especially applicable to the continuous production of uniform, finely divided particles of polyvinyl alcohol through the saponification of polymeric vinyl ester such as polyvinyl acetate. The following is a description of a preferred embodiment of the invention relating to the said production of polyvinyl alcohol.

A solution of 20% by weight polyvinyl acetate in methanol having a viscosity of about 10 poises is introduced into mixer 3 through inlet line 6. Other suitable polyvinyl ester, e.g. polyvinyl formate, can be employed. Other lower alcohols including, for example, ethanol, propanol, and the like can also be employed. Wide ranges of concentration of the polymer in the alcohol are suitable.

An aqueous solution of sodium hydroxide is introduced into the mixer through inlet line 4. Suitably a solution comprising 23% by weight sodium hydroxide is employed although base catalyst solutions containing wide ranges of concentration of basic material can be employed. In place of sodium hydroxide, other basic materials known to catalyze the alcoholysis of polyvinyl acetate can be used. Examples of such additional materials include potassium hydroxide, sodium methylate, potassium methylate, and the like. Alcohol solutions of catalyst can be employed.

The alcohol polymer solution passes through space 7 and through the slit provided between cap 9 and tube 5. The clearance between cap 9 and the inclined end of tube 5 is very small in order to provide a very thin, continuous film of alcohol polymer solution. The aqueous caustic solution passes through line 4 and is sprayed in the form of fine droplets through spray nozzle 10. The catalyst spray thoroughly and uniformly contacts the polymer solution film and immediately initiates saponification thereof. Generally both the catalyst and polymer solutions are preheated to about 35–90° C. The relative amounts of polymer solution and catalyst solution can vary. Illustratively, about 0.15 mol of basic catalyst per mol of polymerized vinyl acetate can be used. Amounts greatly outside this range can be used as will be apparent to those skilled in the art.

The continuous polymer solution film passes downwardly and impinges upon rotary disc 12. Further mixing of the basic catalyst solution and alcoholic polymer solution which already is reacting takes place upon impinging upon the rotary disc. The saponifying mixture is formed into very small, uniform particles or droplets of catalyst and polymer solution as a result of impinging on the rotary disc. The reacting particles or droplets are thrown outwardly toward the reactor walls.

Simultaneously with the introduction of catalyst and polymer solution to the mixer, liquid is introduced into the saponifier through inlet 15. This liquid overflows dam 16 and flows in a film down the whole inner wall of the saponifier as indicated in the drawing. Conveniently, this liquid comprises the liquid reaction product mixture from the saponification, i.e. mainly methanol and methyl acetate. Other liquids including lower alcohols such as ethanol and methanol can be employed as well as various inert liquids, in which polyvinyl alcohol is not soluble.

The saponifying particles are carried to slurry 17 wherein saponification is completed. Total time for completion of the saponification is usually two minutes or less. Agitator 19 provides continuous agitation of the slurry. A product slurry stream is taken from outlet 20. Polyvinyl alcohol particles having uniform small particle size are recovered from the slurry by known techniques, e.g. filtration. The polyvinyl alcohol particles can be further treated in accordance with known procedures. The separated slurry liquid can be recycled to the saponification zone. The saponification zone is preferably heated by a hot water jacket at 50–90° C. to accelerate the saponification.

Practice of the above described embodiment of the invention has many advantages. The catalyst and polymer solution inlet lines are separately located, and initial admixture of these materials occurs in space. During shut-downs plugging of inlet lines is avoided since these lines or the areas adjacent them do not contain the catalyst and polymer mixed.

Plugging and coating of reactor walls with solid reaction material is avoided through the provision of the liquid film flowing down the reactor inner walls. Thus costly equipment plugging and stoppage is avoided.

The polyvinyl alcohol is produced in the form of fine discrete particles of good uniformity which can be readily and uniformly further treated. The rapid and complete mixing achieved through practice of the invention results in rapid, uniform, and more complete saponification of the polyvinyl acetate.

While the above preferred embodiment of the invention relates to the production of polyvinyl alcohol, it will be apparent that the invention has broad applicability to many different systems.

We claim:

1. Apparatus for intimately mixing a relatively viscous liquid with a relatively non-viscous liquid by dispersing the relatively non-viscous liquid in the relatively viscous liquid and subsequently subdividing the resultant mixture, comprising, first inlet means for the relatively viscous liquid, separate second inlet means for the relatively non-viscous liquid, wall means defining a chamber below said first and said second inlet means for receiving said relatively viscous liquid and said relatively non-viscous liquid, means defining an annular slit orifice facing downwardly toward said chamber, means for delivering said relatively viscous liquid from said first inlet means to said annular slit orifice, and said annular slit orifice being constructed to discharge said relatively viscous liquid downwardly therethrough into said chamber in the form of a continuously downwardly flowing cylindrical film, spray-producing means communicating with said separate second inlet means and said spray-producing means disposed to lie interiorly of said downwardly flowing cylindrical film of said relatively viscous liquid, means for delivering said relatively non-viscous liquid from said second inlet means to said spray-producing means, said spray-producing means disposed interiorly of said cylindrical film adapted for producing spray particles of said relatively non-viscous liquid and said spray-producing means adapted to spray said particles of said relatively non-viscous liquid outwardly for contact with the inner surfaces of said downwardly flowing cylindrical film of said relatively viscous liquid, rotating means in said chamber disposed interiorly of said chamber wall means, said rotating means disposed below said annular slit orifice and below said spray-producing means and aligned with said annular slit orifice to engage said continuously downwardly flowing cylindrical film, said rotating means effective for disintegrating said engaged film into fine discrete droplets and said rotating means effective for propelling said fine discrete droplets radially outwardly to said chamber wall means, and means disposed on the upper end of said chamber wall means for forming a liquid film on the interior of said chamber wall means effective to prevent adhesion of said propelled fine discrete droplets to said chamber walls.

2. Apparatus for intimately mixing a relatively viscous liquid with a relatively non-viscous liquid by dispersing the relatively non-viscous liquid and the relatively viscous liquid and subsequently subdividing the resultant mixture, comprising, first inlet means for the relatively viscous liquid, separate second inlet means for the relatively non-viscous liquid, walls defining a chamber disposed below said first inlet means and disposed below said separate second inlet means for receiving said relatively viscous liquid, and said relatively non-viscous liquid, means defining an annular slit orifice facing downwardly toward said chamber, means for delivering said relatively viscous liquid from said first inlet means to said annular slit orifice, said annular slit orifice being constructed to discharge said relatively viscous liquid downwardly therethrough into said chamber in the form of a continuously downwardly flowing cylindrical film of said relatively viscous liquid, spray-producing means disposed substantially along the axis of said annular slit orifice and disposed interiorly of said annular slit orifice, means for delivering said relatively non-viscous liquid from said separate second inlet means to said spray-producing means, said spray-producing means being constructed for producing a spray of particles of said relatively non-viscous liquid and being constructed for directing said produced spray particles outwardly for contact of said spray particles with the inner surfaces of said continuously downwardly flowing cylindrical film, a rotatable disc disposed in said chamber below said annular slit orifice and below said spray-producing means, said rotatable disc aligned along said axis of said annular slit orifice and rotatable about said axis, said rotatable disc having an upper face at right angles to said annular slit orifice axis and disposed for engaging said continuously downwardly flowing cylindrical film and for disintegrating said film into fine discrete droplets, said rotatable disc effective to direct said finely discrete droplets radially outwardly towards the walls of said chamber by centrifugal action, and overflow means for delivering a liquid at the upper end of said walls to cause said liquid to flow down said walls in the form of a liquid film to prevent adhesion of said finely discrete particles to said walls.

3. Apparatus for the production of polyvinyl alcohol by dispersing a relatively non-viscous aqueous sodium hydroxide solution in a relatively viscous alcohol and solution of polyvinyl acetate, comprising, first inlet means for said relatively viscous alcohol solution of polyvinyl acetate, separate second inlet means for said relatively non-viscous aqueous sodium hydroxide solution, wall means defining a chamber for receiving said polyvinyl acetate solution and said aqueous sodium hydroxide solution, means defining an annular slit orifice facing downwardly toward said chamber, means for delivering said polyvinyl acetate solution from said first inlet means to said annular slit orifice, said annular slit orifice being constructed to discharge said polyvinyl acetate solution downwardly therethrough into said chamber in the form of a continuously downwardly flowing cylindrical film, spray-producing means communicating with said separate second inlet means and disposed to lie interiorly of said cylindrical film, means for delivering said aqueous sodium hydroxide solution from said second inlet means to said spray-producing means, said spray-producing means being constructed for producing a spray of particles of said aqueous sodium hydroxide solution outwardly for contact of said spray particles with the inner surfaces of said continuously downwardly flowing cylindrical film of said polyvinyl acetate solution, rotating means in said chamber disposed below said orifice and disposed below said spray-producing means, said rotating means aligned with said annular slit orifice to engage said continuously downwardly flowing cylindrical film, said rotating means effective for disintegrating said engaged film into fine discrete droplets and effective for propelling said fine discrete droplets radially outwardly towards the interior wall means of said chamber, said rotating means comprising a rotatable disc effective to direct said fine discrete droplets outwardly by centrifugal action, and means disposed on the upper end of said chamber wall means for forming a liquid film on the interior of said chamber wall means effective to prevent adhesion of said propelled finely discrete droplets to said chamber walls.

4. Apparatus for the production of polyvinyl alcohol by dispersing a relatively non-viscous aqueous sodium hydroxide solution in a relatively viscous alcohol solution of polyvinyl acetate and subsequently subdividing the resultant mixture, comprising, first inlet means for the relatively viscous alcohol solution of polyvinyl acetate, separate second inlet means for the relatively non-viscous aqueous sodium hydroxide solution, walls defining a chamber below said first inlet means and below said separate second inlet means for receiving said relatively viscous solution and said relatively non-viscous solution, means defining an annular slit orifice facing downwardly toward said chamber, means for delivering said relatively viscous solution from said first inlet means to said annular slit orifice and being constructed to discharge said relatively viscous solution downwardly therethrough into said chamber in the form of a continuously downwardly flowing cylindrical film, spray-producing means communicating with said separate second inlet means, means for delivering said relatively non-viscous solution from said separate second inlet means to said spray-producing means, said spray-producing means disposed substantially along the axis of said annular slit orifice for producing a spray of particles of said relatively non-viscous solution and for directing said spray particles outwardly for contact of said spray particles with the inner surfaces of said continuously downwardly flowing cylindrical film of said relatively viscous solution, said spray-producing means having its outlet substantially downstream of said annular slit orifice, a rotatable disc disposed in said chamber below said annular slit orifice and below said spray-producing means said rotatable disc aligned along said axis of said annular slit orifice and rotatable about said axis, said rotatable disc having an upper face at right angles to said annular slit orifice axis and disposed for engaging said continuously downwardly flowing cylindrical film and for disintegrating said film into fine discrete droplets, said rotatable disc effective to direct said finely discrete droplets radially outwardly toward the walls of said chamber by centrifugal action, and overflow means for delivering a liquid at the upper end of said walls of said chamber to cause said liquid to flow down said walls in the form of a liquid film to prevent adhesion of said droplets to said walls, said overflow means comprising a reservoir surrounding the upper end of said chamber walls for holding said liquid for overflowing the upper edge of said walls.

(References on following page)

References Cited by the Examiner

UNITED STATES PATENTS

| | | | |
|---|---|---|---|
| 2,428,895 | 10/47 | Shoeld | 23—285 X |
| 2,440,730 | 5/48 | Stamatoff | 23—285 X |
| 2,467,105 | 4/49 | Adelson et al. | 260—91.3 |
| 2,504,488 | 4/50 | Antonio et al. | 23—285 X |
| 2,533,058 | 12/50 | Schaffer et al. | 23—285 X |
| 2,758,915 | 8/56 | Vodonik | 23—285 |
| 2,788,337 | 4/57 | Peiswerk et al. | 23—285 X |
| 2,862,916 | 12/58 | Lukman et al. | 260—91.3 |

MORRIS O. WOLK, *Primary Examiner.*

MILTON STERMAN, MAURICE A. BRINDISI,
*Examiners.*